United States Patent
Hugl et al.

(10) Patent No.: US 10,200,990 B2
(45) Date of Patent: Feb. 5, 2019

(54) METHOD AND APPARATUS FOR IMPLEMENTING DYNAMIC SIGNALING OF DOWNLINK CONTROL USAGE

(71) Applicant: NOKIA TECHNOLOGIES OY, Espoo (FI)

(72) Inventors: Klaus Hugl, Vienna (AT); Karol Schober, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 71 days.

(21) Appl. No.: 15/233,686

(22) Filed: Aug. 10, 2016

(65) Prior Publication Data

US 2018/0049189 A1 Feb. 15, 2018

(51) Int. Cl.
*H04L 5/00* (2006.01)
*H04W 72/04* (2009.01)

(52) U.S. Cl.
CPC ....... *H04W 72/0446* (2013.01); *H04L 5/0051* (2013.01); *H04L 5/0094* (2013.01); *H04W 72/042* (2013.01)

(58) Field of Classification Search
CPC ................ H04W 28/0278; H04L 61/2092
(Continued)

(56) References Cited

U.S. PATENT DOCUMENTS

| | | |
|---|---|---|
| 2014/0307696 A1 | 10/2014 | Choi et al. |
| 2015/0003405 A1 | 1/2015 | Liao et al. |

(Continued)

FOREIGN PATENT DOCUMENTS

| | | |
|---|---|---|
| WO | 2016048570 A1 | 3/2016 |
| WO | 2016064049 A1 | 4/2016 |
| WO | 2016123393 A1 | 8/2016 |

OTHER PUBLICATIONS

Nov. 8, 2017 International Search Report and Written Opinion issued in International Patent Application No. PCT/FI2017/050553.

(Continued)

*Primary Examiner* — Iqbal Zaidi
(74) *Attorney, Agent, or Firm* — Squire Patton Boggs (US) LLP

(57) ABSTRACT

A method and apparatus may include performing, by a network node, a short Physical Downlink Shared Channel scheduling decision for a user equipment. The method can also include determining a short Physical Downlink Control Channel candidate for carrying a downlink assignment to the user equipment. The method can also include determining a short Physical Downlink Control Channel candidate set. The short Physical Downlink Control Channel candidate set is specific to the user equipment. The method can also include determining a plurality of logical signaling groups based on the determined candidate set. The method can also include determining which groups of the plurality of logical signaling groups that the network node will perform short Physical Downlink Shared Channel rate matching. The method can also include determining the short Physical Downlink Shared Channel resource mapping and creation of the short Physical Downlink Shared Channel. The method can also include transmitting Downlink Control Information on short Physical Downlink Control Channel and short Physical Downlink Shared Channel to the user equipment.

34 Claims, 7 Drawing Sheets

(58) Field of Classification Search
USPC .................................................. 370/328–339
See application file for complete search history.

(56) References Cited

U.S. PATENT DOCUMENTS

2017/0230994 A1* 8/2017 You ..................... H04W 72/042
2017/0280429 A1* 9/2017 Shen ................. H04W 72/0446
2018/0019836 A1* 1/2018 Kim ..................... H04J 11/0079

OTHER PUBLICATIONS

Interdigital, "Consideration on sPDCCH Design", 3GPP TSG RAN WG1 Meeting #85, R1-165049, Nanjing, China, May 23-27, 2016.
Ericsson, "sPDCCH search space design", 3GPP TSG-RAN WG1 #85, R1-165293, Nanjing, China, May 23-27, 2016.
Huawei et al., "sPDCCH design for short TTI", 3GPP TSG RAN WG1 Meeting #85, R1-164059, Nanjing, China, May 23-27, 2016.
Intel Corporation, "Consideration on S-PDCCH design for latency reduction", 3GPP TSG-RAN WG1 #85, R1-164161, Nanjing, China, May 23-27, 2016.

* cited by examiner

| Candidate within allocation $C$ | # of sREGs of given candidate within allocation $N_{SREG}$ |
|---|---|
| 7 | 12 |
| 5 | 4 |
| 2 | 3 |
| 1 | 2 |
| 3 | 2 |
| 4 | 2 |
| Total: | 25 |

Fig. 2

METHOD AND APPARATUS FOR IMPLEMENTING DYNAMIC SIGNALING OF DOWNLINK CONTROL USAGE

BACKGROUND

Field

Certain embodiments of the present invention relate to implementing a dynamic signaling of downlink control usage in order to, for example, enable resource reuse.

Description of the Related Art

Long-term Evolution (LTE) is a standard for wireless communication that seeks to provide improved speed and capacity for wireless communications by using new modulation/signal processing techniques. The standard was proposed by the 3$^{rd}$ Generation Partnership Project (3GPP), and is based upon previous network technologies. Since its inception, LTE has seen extensive deployment in a wide variety of contexts involving the communication of data.

SUMMARY

According to a first embodiment, a method can include performing, by a network node, a short Physical Downlink Shared Channel scheduling decision for a user equipment. The method can also include determining a short Physical Downlink Control Channel candidate for carrying a downlink assignment to the user equipment. The method can also include determining a short Physical Downlink Control Channel candidate set. The short Physical Downlink Control Channel candidate set is specific to the user equipment. The method can also include determining a plurality of logical signaling groups based on the determined candidate set. The method can also include determining which groups of the plurality of logical signaling groups that the network node will perform short Physical Downlink Shared Channel rate matching. The method can also include determining the short Physical Downlink Shared Channel resource mapping and creation of the short Physical Downlink Shared Channel. The method can also include transmitting Downlink Control Information on short Physical Downlink Control Channel and short Physical Downlink Shared Channel to the user equipment.

In the method of the first embodiment, in the determination of the short Physical Downlink Shared Channel resource mapping, the short Physical Downlink Shared Channel is rate-matched around a candidate carrying the downlink assignment scheduling the short Physical Downlink Shared Channel.

In the method of the first embodiment, in the determination of the short Physical Downlink Shared Channel resource mapping, the short Physical Downlink Shared Channel is rate-matched around candidates of the determined short Physical Downlink Control Channel groups.

In the method of the first embodiment, in the creation of the short Physical Downlink Shared Channel, the short Physical Downlink Shared Channel is punctured by the occupied candidates of the short Physical Control Channel groups that are determined not to be rate-matched.

In the method of the first embodiment, the performing the short Physical Downlink Shared Channel scheduling decision comprises performing the decision by an evolved Node B.

In the method of the first embodiment, only short Physical Downlink Control Channel candidates within the user equipment's short Physical Downlink Shared Channel allocation are included in the candidate set.

In the method of the first embodiment, a short Physical Downlink Control Channel candidate that is used to transmit a downlink assignment for the user equipment is excluded from the candidate set.

In the method of the first embodiment, the determining the plurality of logical signaling groups is based on a grouping rule.

In the method of the first embodiment, the grouping rule comprises grouping based on an equal number of short Physical Downlink Control Channel candidates within a group, based on an equal number of short Physical Downlink Control Channel candidates within a group, or a hybrid grouping based on an equal number of short Physical Downlink Control Channel candidates and short Physical Downlink Control Channel resources within a group.

According to a second embodiment, an apparatus can include at least one processor. The apparatus can also include at least one memory including computer program code. The at least one memory and the computer program code can be configured, with the at least one processor, to cause the apparatus at least to perform a short Physical Downlink Shared Channel scheduling decision for a user equipment. The apparatus can also be caused to determine a short Physical Downlink Control Channel candidate for carrying a downlink assignment to the user equipment. The apparatus can also be caused to determine a short Physical Downlink Control Channel candidate set. The short Physical Downlink Control Channel candidate is specific to the user equipment. The apparatus can also be caused to determine a plurality of logical signaling groups based on the determined candidate set. The apparatus can also be caused to determine which groups of the plurality of logical signaling groups that the apparatus will perform short Physical Downlink Shared Channel rate matching. The apparatus can also be caused to determine the short Physical Downlink Shared Channel resource mapping and creation of the short Physical Downlink Shared Channel. The apparatus can also be caused to transmit Downlink Control Information on short Physical Downlink Control Channel and short Physical Downlink Shared Channel to the user equipment.

In the apparatus of the second embodiment, in the determination of the short Physical Downlink Shared Channel resource mapping, the short Physical Downlink Shared Channel is rate-matched around a candidate carrying the downlink assignment scheduling the short Physical Downlink Shared Channel.

In the apparatus of the second embodiment, in the determination of the short Physical Downlink Shared Channel resource mapping, the short Physical Downlink Shared Channel is rate-matched around candidates of the determined short Physical Downlink Control Channel groups.

In the apparatus of the second embodiment, in the creation of the short Physical Downlink Shared Channel, the short Physical Downlink Shared Channel is punctured by the occupied candidates of the short Physical Control Channel groups that are determined not to be rate-matched.

In the apparatus of the second embodiment, the performing the short Physical Downlink Shared Channel scheduling decision comprises performing the decision by an evolved Node B.

In the apparatus of the second embodiment, only short Physical Downlink Control Channel candidates within the user equipment's short Physical Downlink Shared Channel allocation are included in the candidate set.

In the apparatus of the second embodiment, a short Physical Downlink Control Channel candidate that is used to transmit a downlink assignment for the user equipment is excluded from the candidate set.

In the apparatus of the second embodiment, the determining the plurality of logical signaling groups is based on a grouping rule.

In the apparatus of the second embodiment, the grouping rule comprises grouping based on an equal number of short Physical Downlink Control Channel candidates within a group, based on an equal number of short Physical Downlink Control Channel candidates within a group, or a hybrid grouping based on an equal number of short Physical Downlink Control Channel candidates and short Physical Downlink Control Channel resources within a group.

According to a third embodiment, a computer program product can be embodied on a non-transitory computer readable medium, the computer program product can be configured to control a processor to perform a method according to the first embodiment.

According to a fourth embodiment, a method can include receiving, by a user equipment, downlink control information and short Physical Downlink Shared Channel. The downlink control information comprises a downlink assignment, and the downlink assignment is carried on short Physical Downlink Control Channel. The method can also include determining a short Physical Downlink Control Channel group signaling indication bitmap. The method can also include determining a short Physical Downlink Shared Channel resource allocation. The method can also include determining a short Physical Downlink Control Channel candidate set based on the determined resource allocation. The method can also include determining logical signaling groups based on the determined candidate set. The method can also include determining a short Physical Downlink Shared Channel resource mapping. The method can also include decoding the short Physical Downlink Shared Channel based on the determined short Physical Downlink Shared Channel resource mapping.

In the method of the fourth embodiment, in the determination of the short Physical Downlink Shared Channel resource mapping, the user equipment assumes short Physical Downlink Shared Channel rate-matching around a candidate carrying the downlink assignment scheduling the short Physical Downlink Shared Channel.

In the method of the fourth embodiment, in the determination of the short Physical Downlink Shared Channel resource mapping, the user equipment assumes short Physical Downlink Shared Channel rate-matching around candidates of the short Physical Downlink Control Channel group, for which the signaling in the downlink control information indicated rate-matching.

In the method of the fourth embodiment, in the determination of the short Physical Downlink Shared Channel resource mapping, the user equipment assumes short Physical Downlink Shared Channel to be mapped on the shared Physical Downlink Control Channel candidates of a group, for which the signaling in the downlink control information indicated mapping of short Physical Downlink Shared Channel.

In the method of the fourth embodiment, the receiving downlink control information comprises receiving from an evolved Node B.

In the method of the fourth embodiment, only short Physical Downlink Control Channel candidates within the user equipment's short Physical Downlink Shared Channel allocation are included in the candidate set.

In the method of the fourth embodiment, a short Physical Downlink Control Channel candidate that is used to transmit the downlink assignment for the user equipment is excluded from the candidate set.

In the method of the fourth embodiment, the determining the logical signaling groups is based on a grouping rule.

In the method of the fourth embodiment, the grouping rule comprises grouping based on an equal number of short Physical Downlink Control Channel candidates within a group, based on an equal number of short Physical Downlink Control Channel candidates within a group, or a hybrid grouping based on an equal number of short Physical Downlink Control Channel candidates and short Physical Downlink Control Channel resources within a group.

According to a fifth embodiment, an apparatus includes at least one processor. The apparatus includes at least one memory including computer program code. The at least one memory and the computer program code can be configured, with the at least one processor, to cause the apparatus at least to receive downlink control information and short Physical Downlink Shared Channel. The downlink control information comprises a downlink assignment, and the downlink assignment is carried on short Physical Downlink Control Channel. The apparatus can also be caused to determine a short Physical Downlink Control Channel group signaling indication bitmap. The apparatus can also be caused to determine a short Physical Downlink Shared Channel resource allocation. The apparatus can also be caused to determine a short Physical Downlink Control Channel candidate set based on the determined resource allocation. The apparatus can also be caused to determine logical signaling groups based on the determined candidate set. The apparatus can also be caused to determine a short Physical Downlink Shared Channel resource mapping. The apparatus can also be caused to decode the short Physical Downlink Shared Channel based on the determined short Physical Downlink Shared Channel resource mapping.

In the apparatus of the fifth embodiment, in the determination of the short Physical Downlink Shared Channel resource mapping, the apparatus assumes short Physical Downlink Shared Channel rate-matching around a candidate carrying the downlink assignment scheduling the short Physical Downlink Shared Channel.

In the apparatus of the fifth embodiment, in the determination of the short Physical Downlink Shared Channel resource mapping, the apparatus assumes short Physical Downlink Shared Channel rate-matching around candidates of the short Physical Downlink Control Channel group, for which the signaling in the downlink control information indicated rate-matching.

In the apparatus of the fifth embodiment, in the determination of the short Physical Downlink Shared Channel resource mapping, the apparatus assumes short Physical Downlink Shared Channel to be mapped on the shared Physical Downlink Control Channel candidates of a group, for which the signaling in the downlink control information indicated mapping of short Physical Downlink Shared Channel.

In the apparatus of the fifth embodiment, the receiving downlink control information comprises receiving from an evolved Node B.

In the apparatus of the fifth embodiment, only short Physical Downlink Control Channel candidates within the apparatus' short Physical Downlink Shared Channel allocation are included in the candidate set.

In the apparatus of the fifth embodiment, a short Physical Downlink Control Channel candidate that is used to transmit the downlink assignment for the apparatus is excluded from the candidate set.

In the apparatus of the fifth embodiment, the determining the logical signaling groups is based on a grouping rule.

In the apparatus of the fifth embodiment, the grouping rule comprises grouping based on an equal number of short Physical Downlink Control Channel candidates within a group, based on an equal number of short Physical Downlink Control Channel candidates within a group, or a hybrid grouping based on an equal number of short Physical Downlink Control Channel candidates and short Physical Downlink Control Channel resources within a group.

According to a sixth embodiment, a computer program product can be embodied on a non-transitory computer readable medium. The computer program product can be configured to control a processor to perform a method according to the fourth embodiment.

BRIEF DESCRIPTION OF THE DRAWINGS

For proper understanding of the invention, reference should be made to the accompanying drawings, wherein:

FIG. 2 illustrates an example of sorting candidates, in accordance with certain embodiments of the present invention.

DETAILED DESCRIPTION

Figure 1:
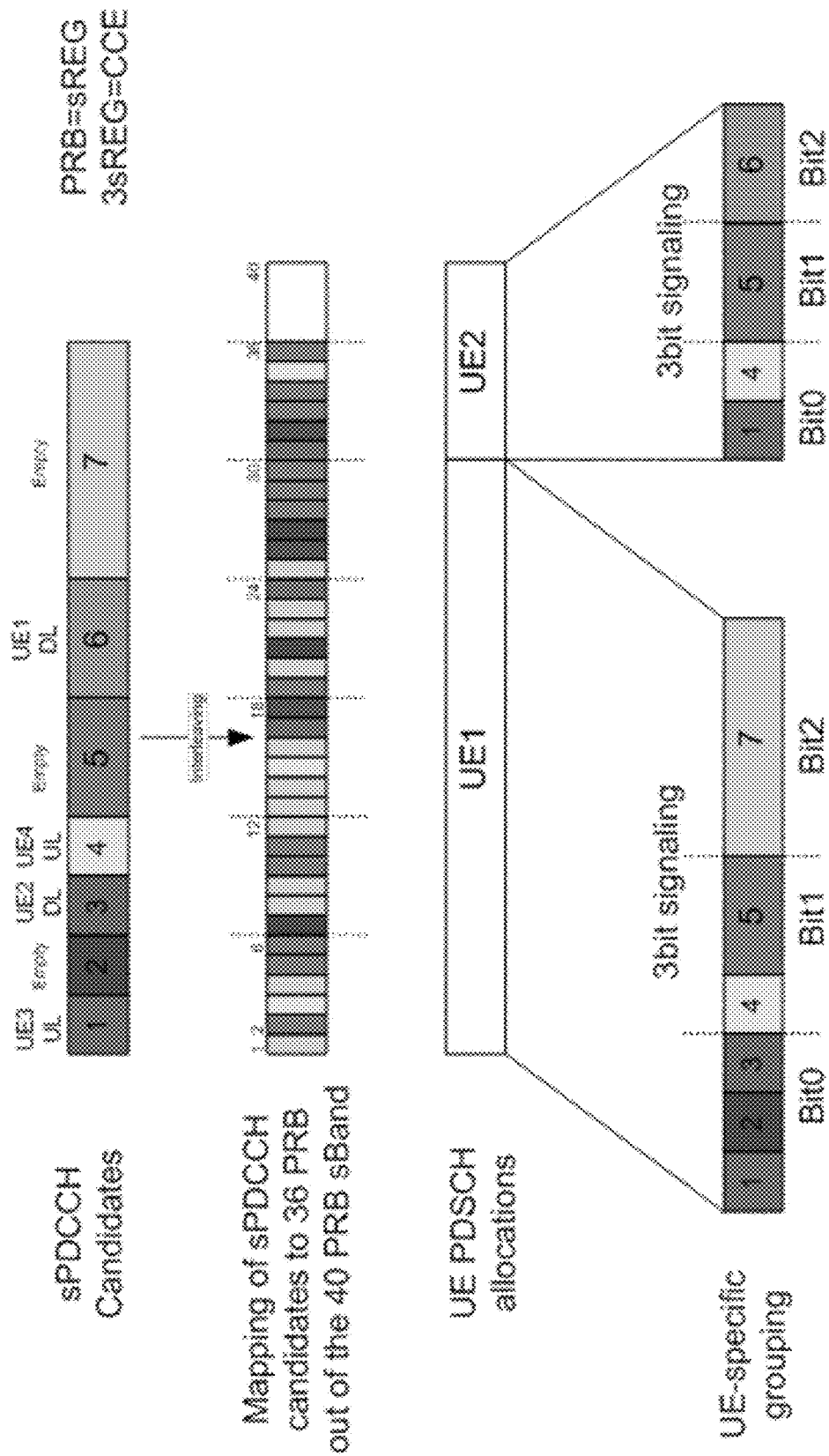
FIG. 1 illustrates an example sPDCCH signaling that enables reuse of sPDCCH candidate resources for sPDSCH transmission, in accordance with certain embodiments of the present invention.

Certain embodiments of the present invention relate to implementing a dynamic signaling of downlink control usage in order to, for example, enable resource reuse. Certain embodiments of the present invention relate to Long Term Evolution-Advanced (LTE-Advanced) Pro systems, which may be a part of 3GPP LTE Release 13/14. Specifically, certain embodiments can be directed to reducing latency. Certain aspects of certain embodiments may fall within the scope of Release 13 Study Item "Study on Latency reduction techniques," which is carried out during 1H/2016 in 3GPP. The conclusions of this study item indicate that latency reduction can be achieved when reducing a processing time as well as reducing a Transmission Time Interval (TTI) length.

At the June 2016 RAN plenary (RAN#72), a follow-up work item that is based on the study item outcome was approved in RP-161299, where the objectives included the introduction of shorter TTI operation with reduced processing, and also included enabling of reduced processing time for legacy 1 ms TTI channel designs.

From RP-161299:
For Frame structure type 1: [RAN1, RAN2, RAN4]
  Specify support for a transmission duration based on 2-symbol sTTI and 1-slot sTTI for sPDSCH/sPDCCH
  Specify support for a transmission duration based on 2-symbol sTTI, 4-symbol sTTI, and 1-slot sTTI for sPUCCH/sPUSCH
  Down-selection is not precluded
  Study any impact on CSI feedback and processing time, and if needed, specify necessary modifications (not before RAN1 #86bis)
For Frame structure type 2: [RAN1, RAN2, RAN4]
  Specify support for a transmission duration based on 1-slot sTTI for sPDSCH/sPDCCH/sPUSCH/sPUCCH
  Study any impact on CSI feedback and processing time, and if needed, specify necessary modifications (not before RAN1 #86bis)

Furthermore, within the study item directed to latency reduction, the following text has been captured in 3GPP TR 36.881. The text indicates that the unused Downlink (DL) control/(short) Physical Downlink Control Channel (sPDCCH) resources can be reused by a data channel. This minimizes the control overhead, which is one of the main issues of shorter TTI.

Referring to 3GPP TR 36.881, "A specific DL control channel sPDCCH (PDCCH for short TTI) needs to be introduced for short TTI. Each short TTI on DL may contain sPDCCH decoding candidates. From a resource utilization perspective, sPDSCH assigned by a sPDCCH can be mapped to resources that are left unused by any sPDCCH. CRS-based sPDCCH is recommended to be supported. DMRS-based sPDCCH is recommended to be supported."

With regard to dynamic reuse of unused DL control resources for Physical Downlink Shared Channel (PDSCH) operation, during the Study Item (SI) phase, there have been discussions relating to the operation of DL control for shorter TTI operation.

The related performance evaluations and investigations during the SI phase revealed several facts.

1. For example, placing DL control information for several users within a single shorter TTI is needed. First, the scheduling of several users in DL direction within a TTI is required in order to boost the DL performance, as pure Time Division Multiplexing (TDM) for shorter TTI will decrease the user perceived throughput and will increase the experienced end-user latency. Moreover, the network may need to schedule different users in the DL and UL directions at the same time. As a consequence, even if only a single user is to be scheduled in the DL direction in a (short) TTI, the UL grant of a different user may need to be transmitted within the same sTTI.

2. The DL control overhead will increase with shorter TTI operation, as, for each sTTI, assignments/grants for sPDSCH/sPUSCH operation may need to be transmitted, although the overall amount of DL resources within a sTTI may be much smaller compared to legacy TTI (i.e., ½ with slot-level TTI as well as ⅐ with 2-symbol TTI, as compared to the legacy TTI length of 1 subframe). Therefore, the DL performance for shorter TTI operation is dependent on the assumed DL control overhead, as shown in the evaluations during the SI phase.

3. Combining the facts of 1 and 2 above, there is a need to still have a sufficiently large DL control region, in order to enable the transmission of several (UL and DL) grants within a (short) Transmission Time Interval (sTTI). At the same time, designing the DL control operation to waste resources from unused DL control resources (as performed by legacy PDCCH as well as EPDCCH) will deteriorate the DL shorter TTI performance.

Therefore, it has been concluded (in the SI phase) that there should be an enabling of reuse of unused DL control resources for sPDSCH transmission.

Certain embodiments of the present invention may be directed to dynamic signalling of unused (short) Physical Downlink Control Channel (sPDCCH) resources/candidates within the DL assignment, enabling the mapping of (short) Physical Downlink Shared Channel (sPDSCH) to unused sPDCCH resources/candidates.

As shown above in TR 36.881, as the outcome of the SI, there is the intention to enable the assignment of PDSCH to unused sPDCCH resources/candidates.

One option that is discussed in the SI phase would be to simply map PDSCH to all resources, and to puncture sPDSCH with the actually used sPDCCH resources. This will nominally create the highest possible resource utilization, as any DL resources within a TTI can be used for PDSCH. However, this puncturing will generally degrade the performance. The amount of degradation may depend on the number of punctured sPDSCH Resource Elements (REs) as well as the nominal coding rate.

A second option would be to rate-match sPDSCH around the user's own DL assignment resources within the allocated sPDCCH resources and assume puncturing otherwise. Depending on the number of DL assignments for other UEs and all the UL grants, this second option improves the situation as compared to performing puncturing only, in case the DL assignment resources are included within the user's own sPDSCH allocation. However, puncturing of a majority of the sPDCCH resources may be needed.

Another option that is discussed is the signalling of used and/or unused sPDCCH candidates in the DL assignment, and assuming rate-matching of the PDSCH allocation around the occupied sPDCCH resources. Depending on the number of overall sPDCCH candidates and the sPDCCH design, specifically depending on the search space design, this option will require a rather extensive number of bits to be signalled as a part of the DL grant scheduling sPDSCH.

Certain embodiments of the present invention propose enabling a limited dynamic signaling of resources within an allocated sPDSCH bandwidth. The suggested operation combines sPDSCH rate-matching around its own DL grant, explicit dynamic signaling of a fraction of sPDCCH candidates within a UE's sPDSCH allocation for which sPDSCH is rate-matched around, with a UE-specific signalled candidate set, and UE-specific mapping of the signalling bits to the sPDCCH candidates, as well as assuming puncturing of the sPDCCH candidates, which were not rate-matched by sPDSCH, however are occupied.

3GPP LTE currently supports only a rather course granularity of dynamic DL control overhead adjustment. As for PDCCH, the Physical Control Format Indicator Channel (PCFICH) is indicating the number of Orthogonal Frequency Division Multiplexing (OFDM) symbols for the PDCCH to occupy, which can change on a subframe-to-subframe basis. For Enhanced Physical Downlink Control Channel (EPDCCH), the resources are semi-statically configured, and a configured EPDCCH set can either be used or not used within a subframe (on/off). However, none of them supports the reuse of resources within the DL control region. As such, for example, with PDCCH, in the event that a single grant is transmitted, the other unused resources within the PDCCH region cannot be used for PDSCH transmission.

Moreover, as discussed above, a puncturing of sPDCCH resources, a rate-matching around own DL grant/assignment, and dynamic signaling (without providing any details) have been discussed.

R1-165293 discloses a search space design that enables signaling of unused resources. This solution assumes using a same Aggregation (AL) level for all UEs, and this solution assumes that each user monitors all the candidates within sPDCCH. These two assumptions are generally unacceptable for control operation. In particular, the need to monitor all the sPDCCH candidates will increase the blind decoding requirements for the UE, assuming a reasonable overall number of sPDCCH candidates are needed for multiplexing several uplink (UL) and downlink (DL) grants.

Certain embodiments of the present invention use an x-bit bitmap in a DL grant/assignment, where each bit indicates whether an eNB is or is not rate matching around a group of sPDCCH candidates out of the total number of sPDCCH candidates. Another distinguishing factor is that the grouping of the sPDCCH candidates in the groups (referring to single bits) is UE-specific and, at least, dependent on allocated sPDSCH resources.

Certain embodiments of the present invention include the following logical steps:

The UE determines all the sPDCCH candidates within a DL TTI.

For each UE, define a UE-specific sPDCCH candidate set S for signaling of unused/used candidates The UE-specific sPDCCH candidate set for signaling takes the sPDSCH allocation of the UE into account sPDCCH candidates that do not have resources (i.e. (short) Control Channel Element/(short) Resource Element Groups (sCCEs/sREGs)) within the allocated sPDSCH (bandwidth) are excluded from the set S in order to make the candidate set as small as possible and to enable signaling that is as efficient as possible.

The sPDCCH candidate where the DL grant is transmitted to the UE can be excluded from the set S as well, in order to make the set as small as possible The candidate set S is split into Xgroups, assuming Xbits for the signaling of the rate-matching. The groups are denoted here with $G_1$ to $G_X$ There may be different pre-defined or partially-configured rules (partially-configured by the eNB) that determine how the grouping is done. Additional details regarding the different rules are discussed below.

The eNB transmits the DL assignment to the UE. The eNB may transmit a bitmap of Xbits, where each bit indicates if sPDSCH is rate-matched around the group of sPDCCH candidates or not.

The eNB may decide whether rate-matching is performed or not.

Each group of sPDCCH candidates includes at least one sPDCCH candidate, assuming the candidate set S is larger than the number of groups X.

The UE assumes the eNB sPDSCH is rate-matched according to the signaled rate matching assumptions of the signaled sPDCCH groups, where the UE-specific sPDCCH group is as described above (where eNB and UE have the same understanding of the sPDCCH groups).

FIG. 1 illustrates an example sPDCCH signaling that enables reuse of sPDCCH candidate resources for sPDSCH transmission, in accordance with certain embodiments of the present invention. The general assumption underlying this mode of operation is that the UE is aware of all the sPDCCH candidates within a certain TTI. The total number of sPDCCH candidates of the different aggregation levels may be either fixed, higher-layer configured, and/or may be semi-statically signaled through common signaling. The signaling may occur at every or every other subframe. The UE itself may not need to monitor all the sPDCCH itself, as the overall sPDCCH candidate search space may be larger than the one for a single UE, in order to enable reasonable multi-user DL control operation within a TTI and, at the same time, limit the number of downlink control information (DCI) blind decodes for the UE.

In the example of FIG. 1, there are, in total 7, sPDCCH resources/candidates of different aggregation levels (ALs). In the example, candidates 1-4 are of the aggregation level 1 (i.e., 1 Control Channel element (CCE) used), candidates 5-6 are of AL2 (i.e., 2 CCEs used) and candidate 7 is having AL 4 (i.e., 4 CCEs used). These seven sPDCCH candidates are illustrated on the top of FIG. 1. Each UE may not need to monitor all the candidates. As an example, a UE may only need to monitor a smaller number of candidates of some of the aggregation levels. For example, the UE may only need to monitor 2 candidates of AL1.

The sPDCCH candidates are mapped with an interleaver on the relevant part of the band available either for sPDSCH operation overall, or alternatively on the band that is available for sPDCCH operation being smaller than the overall available sPDSCH bandwidth. In the example of FIG. 1, the available band for shorter TTI operation in the DL direction is 40 Physical Resource Blocks (PRBs), but the sPDCCH is only interleaved over 36 PRBs in this example.

In the example of FIG. 1, 30 Physical Resource Blocks (PRBs) of sPDSCH are allocated to UE1, and the DL assignment is transmitted on sPDCCH candidate 6. Referring to the allocated band for UE1, all the sPDCCH candidates occupy at least some resources within the allocated band. Therefore, all the 7 sPDCCH candidates need to be considered when grouping the candidates for the rate-matching signaling. The candidate carrying the DL assignment can be excluded from the sPDCCH candidate set for signaling, as the UE would anyhow assume that the PDSCH is rate-matched around the own DL assignment scheduling the sPDSCH.

Therefore, all candidates except candidate #6 need to be considered in the set of sPDCCH candidates used for the UE-specific grouping for UE1, as shown in FIG. 1 (i.e., the candidate set for UE1 is given by $S_{UE1}=\{C_1,C_2,C_3,C_4,C_5,C_7\}$). Similarly, UE could automatically rate-match around Downlink Control Information (DCI) candidate carrying own UL grant within the sPDCCH. However, it cannot be 100% guaranteed that UE is able to decode the DCI carrying the UL grant. In the event of UL grant decoding failure, there would be a mismatch of the sPDSCH resource mapping and, therefore, the UE's own UL grant location is nevertheless included in the candidate set for signaling for the UE.

For the rather narrowband PDSCH allocation of UE2, only 5 (candidates #1, 2, 4, 5 and 6) out of the 7 total sPDCCH candidates have some resources within the allocated sPDSCH bandwidth of UE2. The DL grant is carried on sPDCCH candidate #2, which can, therefore, be excluded from the set of considered sPDCCH candidates as well. Therefore, the sPDCCH candidate set that is considered for the envisioned signaling of UE2 includes sPDCCH candidates $S_{UE2}=\{C_1,C_4,C_5,C_6\}$.

As shown in this example, depending on the interleaver design, the sPDSCH allocation and the candidate on which DL assignment is transmitted to a UE, a UE-specific candidate set of different size and content, is given. Therefore, the rate-matching signaling for different UEs will need to only take different candidates into account and, therefore, the signaling bits should have a different meaning for different UEs with different sPDSCH allocation.

For UE1, the 3 groups for the 3-bit signaling in the exemplary grouping example of FIG. 1 are given by $G1_{UE1}=\{C_1,C_2,C_3\}$, $G2_{UE1}=\{C_4,C_5\}$ and $G3_{UE1}=\{C_7\}$. In this case, the first group includes 3 candidates including 7 sREGs (REG=resource element group) within the allocated bandwidth, $G2_{UE1}$ includes 2 candidates with 6 sREGs within the allocated PDSCH, and $G3_{UE1}$ includes the single AL4 candidate #7 having all its 12 sREGs within the allocated PDSCH bandwidth of UE1. The exemplary grouping of FIG. 1 is far from being even in the number of addressable number of sREGs, but a finer granularity than using an individual signaling bit for the single sPDCCH candidate #7 is not possible.

For UE2, the 3 groups for the 3-bit signaling in the exemplary grouping example of FIG. 1 are given by $G1_{UE2}=\{C_1,C_4\}$, $G2_{UE2}=\{C_5\}$ and $G3_{UE2}=\{C_6\}$. In this case, the first group including 2 candidates includes 2 (slow) Resource Element Groups (sREGs) within the allocated bandwidth. $G2_{UE2}$ includes only candidate #5 with a single sREG within the allocated sPDSCH, and $G3_{UE2}$ includes the candidate #6 having 2 sREGs within the allocated sPDSCH bandwidth of UE2. The grouping for UE2 is much more, even in the number of sREGs within each individually addressable group G. Moreover, as the allocated bandwidth for UE2 is much smaller (resulting in a smaller candidate set and less overall sREGs within the PDSCH allocation), the signaling granularity for UE2 becomes much finer as compared to the case of assuming some fixed signaling, not taking the sPDSCH allocation into account, as can be seen from the small number of candidates & sREGs within a group for UE2 (compared to UE1). The grouping shown in FIG. 1 illustrates one example grouping. Different grouping methods are described in more detail below. The eNB may decide if a certain sPDCCH group is indicated as to be rate-matched or not, which is discussed in further detail below.

With regard to grouping of sPDCCH candidates set S into the groups G1 to GX, from a signaling efficiency point of view, a grouping of candidates could follow different rules. Either a specific rule is specified, or alternatively, the eNB may configure a rule (out of a set of possible rules to be specified).

First, one grouping rule may determine that grouping is to be based on an equal number of sPDCCH resources within a group. The motivation for this grouping method is to have an as equal signaling granularity in a number of sPDCCH resources per signaling bit as possible. In other words, each bit would indicate a similar amount of sPDCCH resources to be rate matched.

In general, the number of sPDCCH resources is the number of sPDCCH Orthogonal Frequency Division Multiplexing (OFDM) REs within the sPDSCH. In the example of FIG. 1, each sREG includes 12 REs within a single PRB. Therefore, the balancing of the number of resources between the groups can be done on sPDCCH candidate sREG level instead of sPDCCH candidate RE level, as a single sREG is either fully or not at all present in the users sPDSCH allocation.

A detailed implementation example to achieve an approximately equal number of sREGs within each group is described. First, the UE/eNB sorts all considered candidates within its sPDSCH allocation, according to the number of sREGs within the sPDSCH allocation. According to the example of FIG. 1, UE1 has 6 candidates which are sorted in FIG. 2 according to the number of sREGs within UE1's sPDSCH allocation, and a total number of sREGs $N_{tot}$ within the allocations is 25. Note that, in the event that the candidates have an equal number of sREGs, different sorting rules may apply, such as AL, position of the candidate's first sREG and/or index of the candidate, etc. In the example of FIG. 2, the index of the candidate is used in increasing order with the same number of sREGs within the sPDSCH allocation.

When candidates are sorted, a nominal number of sREGs per bit is computed $$N_{nom,sREG} = \left[ \frac{N_{tot}}{X} \right],$$

where X is a number of signaling bits in DCI, $N_{tot}$ is total number of sREGs within sPDSCH of the candidate set S of the UE and [■] denotes rounding operation. In the example, $$N_{nom,sREG} = \left[ \frac{25}{3} \right] = 8$$

assuming X=3.

Consequently, a grouping starts from the candidate with the most of the sREGs (i.e., top down in FIG. 2):
1) $C_7$ has $N_{7,sREG}=12>N_{nom,sREG}$, therefore, $G1_{UE1}=\{C_7\}$. Now three sREGs are left and two signaling bits, re-compute the nominal number $$N'_{nom,sREG} = \left[ \frac{25-12}{2} \right] = 7.$$

2) Taking the next available top-down candidate $C_5$ has $N_{1,sREG}=4<N'_{nom,sREG}$, therefore, we search for candidate(s) that can best fulfill the target of $N'_{nom,sREG}$, in our example it is $C_2$. Now $N_{5,sREG}+N_{2,sREG}=7=N_{nom,sREG}$, therefore $G2_{UE1}=\{C_5,C_2\}$.
3) $C_1, C_3$ and $C_4$ are left and form the third group $G3_{UE1}=\{C_1,C_3,C_4\}$ comprising 6 sREGs.

The partitioning of sREGs within each group is the best possible, i.e [12, 7, 6]. However, the number of candidates within each group is unbalanced, i.e. [1, 2, 3]. The three steps above and the related ordering of FIG. 2 are just exemplary and other ways in terms of candidate selection and ordering can be applied in order to achieve a grouping targeting an as equal number of sPDCCH resources per group as possible.

Next, another grouping rule may determine that grouping is to be based on an equal number of sPDCCH candidates within a group. The motivation for this grouping method is to have an as equal signaling granularity in a number of sPDCCH candidates per signaling bit as possible. As either a sPDCCH candidate is used for conveying some DCI to a UE within the cell or not, this tries to balance the granularity of the signaled sPDCCH candidates.

Referring to some detailed examples, to achieve an equal number of candidates within the group, the eNB/UE could first sort out the candidates as in previous example, given by FIG. 2.

FIG. 2 illustrates sorted candidates of UE1 in FIG. 1 according to the number of sREGs within UE1's allocation. When candidates are sorted, UE/eNB computes the nominal number of candidates per group $$N_{nom,cand} = \left[ \frac{N_{cand}}{X} \right],$$

where X is the number of signaling bits in DCI for the intended sPDCCH usage signaling, $N_{tot,cand}$ is total number of sPDCCH candidates within sPDSCH. In the example, $$N_{nom,cand} = \left[ \frac{6}{3} \right] = 2.$$

The UE/eNB separates the candidates into X=3 groups by placing $N_{nom,cand}$ candidates in a group starting from top to bottom of the list in FIG. 2. Therefore, the following groups are formed in the example: $G1_{UE1}=\{C_7,C_5\}$, $G2_{UE1}=\{C_2,C_1\}$ and $G3_{UE1}=\{C_3,C_4\}$. Hereby an equal number of candidates per group is achieved, but the partitioning of the number of sREGs between groups is the worst possible, i.e. [16, 5, 4]. The selection of the candidates and the related ordering of FIG. 2 are just exemplary, and other ways, in terms of candidate selection and ordering, can be applied in order to achieve a grouping targeting that has as equal number of sPDCCH candidates per group as possible.

Therefore, another grouping rule may determine that grouping is to be Hybrid grouping based on as equal number of sPDCCH candidates and as equal number of sPDCCH resources within a group/per signaling bit as possible. Here, the goal is trying to optimize for both criteria at the same time, in order to achieve a good balance between the number of sPDCCH candidates, as well as a number of sPDCCH resources a single bit is addressing.

In an example implementation, the eNB/UE may sort the sPDCCH candidates in the set S for a UE1 as in previous two examples, i.e. as in FIG. 2. After sorting, the pairing may follow the principle of bottom-top hopping in order to combine sPDCCH candidates with a large number of sREGs and a small number of sREGs within a group, to get the balance on the number of candidates and related sREGs. For the case of UE1, this will create groups $G1_{UE1}=\{C_4,C_7\}$ $G2_{UE1}=\{C_3,C_5\}$ and $G3_{UE1}=\{C_1,C_2\}$ achieving partitioning of sREGs between the groups of [14,6,5], which is better than [16, 5, 4]. Note that bottom-top hopping and top-bottom hopping would achieve the same output in this example. However, when an odd number of candidates per group needs to be achieved, it is more beneficial to use the bottom-top approach. For example, with 3 candidates per group, it is better (from an equal sREG partitioning point of view) to have two small candidates and one large in a group, rather than vice versa. The selection of the candidates by bottom-top hopping and the related ordering of FIG. 2 are just exemplary, and other ways in terms of candidate selection and ordering can be applied in order to achieve a grouping targeting an as equal number of sPDCCH candidates per group and as equal number of sREGs per group as possible.

These three more advanced grouping rules out of the UE-specific sPDCCH candidate set S are just examples. Different or simpler grouping rules can be envisioned as well.

With certain embodiments, there may be eNB flexibility in indicating a group to be rate-matched. When the sPDCCH signaling groups G are formed for a given UE, the eNB signals (with a single bit) whether or not the sPDSCH for the UE is rate-matched around this group of sPDCCH candidates.

It is up to the eNB to decide for which group that the eNB indicates rate-matching for, and for which group rate-matching is not applied, taking the number of occupied and unused sPDCCH resources within an sPDCCH signaling group into account, as well as potentially considering the underlying sPDSCH coding rate.

Clearly, if all the sPDCCH resources or candidates within an sPDCCH group are used for DL control transmission, the eNB will indicate rate-matching around all the sPDCCH group (in order to avoid the negative effect of puncturing). Similarly, if all the sPDCCH resources/candidates within a group are available for sPDSCH transmission, the eNB will signal "0" for such a group, indicating that sPDSCH is mapped on these resources.

In the example of FIG. 1, for UE2, the eNB will signal a bitmap of [101], indicating that rate-matching around groups $G1_{UE2}=\{C_1,C_4\}$ and $G3_{UE2}=\{C_6\}$ is to be performed, as all these sPDCCH candidates are used to carry DCI for UEs, as shown on top of FIG. 1. Mapping of sPDSCH onto $G2_{UE2}=\{C_5\}$ is indicated, as in the example of FIG. 1, sPDCCH candidate #5 is empty (i.e., not used for carrying DL control in that TTI).

Having all or none of the sPDCCH candidates used for DL control transmission, as in case of UE2 of FIG. 1, is still straightforward, but in case of UE1, this is only the case for the $3^{rd}$ group. For the other two groups, there is a mix of occupied and unused sPDCCH resources within the group.

Looking at the first group of UE1 of the example in FIG. 1 ($G1_{UE1}=\{C_1,C_2,C_3\}$), sPDCCH candidate #1 is used to carry the UL assignment for UE3 and the sPDCCH candidate #3 the DL assignment for UE2. Only the resources of sPDCCH candidate #2 would be available for sPDSCH transmission. From the signaling perspective, 4 sREGs (of sPDCCH candidates #1 & #3) are occupied by DCI, whereas the 3 sREGs of sPDCCH candidate would be, in principle, available for sPDSCH. In case the eNB operates conservatively in terms of using puncturing, the eNB might indicate to do rate-matching around $G1_{UE1}$ and is giving up the, in principle, available resources of sPDCCH candidate #2. For $G2_{UE1}=\{C_4,C_5\}$, the situation is more clear, as the 4 sREGs of sPDCCH candidate #5 are available for sPDSCH operation and only 2 sREGs for sPDCCH candidate #4 (carrying the UL assignment for UE4) are occupied. Therefore, the eNB may consider reusing 4/6=66% of the sPDCCH resources of the second group, by indicating no rate-matching around $G2_{UE1}$, allocates PDSCH to the available sPDCCH resources and punctures the DCI on sPDCCH candidate #4 from the sPDSCH.

According to certain embodiments of the present invention, the eNB can perform some or all of the following functionality:

1. The eNB may perform a sPDSCH scheduling decision for a specific UE
2. The eNB may choose a certain appropriate sPDCCH candidate for carrying the DL assignment to the UE
   The choice of the sPDCCH candidate may be a candidate having plenty of resources within the UEs PDSCH allocation, in order to reduce the sPDCCH resources of the remaining sPDCCH candidates within the sPDSCH allocation
3. The eNB may determine the UE-specific sPDCCH candidate set for signaling
   With certain embodiments, only sPDCCH candidates within the UEs sPDSCH allocation are included in the set of candidates
   With certain embodiments, the sPDCCH candidate that is used to transmit the DL assignment for the UE is excluded from the candidate set
4. The eNB may determine X logical signaling groups from the determined set of sPDCCH candidates according to a certain grouping rule
   The rule may be given in the specification or may be configurable (at least one from a set of specified rules)
   The rules may include, for example:
   i. Grouping based on an equal number of sPDCCH resources within a group
   ii. Grouping based on an equal number of sPDCCH candidates within a group
   iii. Hybrid grouping based on an equal number of sPDCCH candidates and sPDCCH resources within a group.
5. The eNB may determine for which logical signaling groups that the eNB will perform and indicate sPDSCH rate-matching of sPDSCH around the sPDCCH candidates/resources of the respective logical channel groups within the sPDSCH allocation. In general, the eNB decides the rate-matching of the candidates—where the granularity of the rate matching is given by the logical channel group. If the eNB determines to do rate matching for a certain logical channel group, it will indicate the logical channel group being rate-matched—and, in the PDSCH resource allocation, perform rate-matching around all the sPDCCH candidates of the indicated logical channel group(s).
   In the event that all the sPDCCH resources of a group are used for DCI transmission, rate-matching is indicated (i.e., a signaling bit of the group corresponds to "1")
   In the event that none of the sPDCCH resources/candidates of a group are used for DCI transmission, sPDSCH mapping on the sPDCCH resources is indicated (i.e., a signaling bit of the group corresponds to "0")
   In the event of partially used sPDCCH resources of a group for DCI transmission in a sTTI, the eNB may or may not indicate sPDSCH rate-matching around the sPDCCH resources
   i. The decision may take the share of used/unused sPDCCH resources within the sPDSCH into account
   ii. The sPDSCH coding rate may be taken into account in the eNB decision
6. The eNB includes the X determined sPDCCH group signaling bits of the previous step in the DCI carrying the DL assignment
7. The eNB creates the sPDSCH resource mapping based on the indicated rate-matching around sPDCCH resources of the different logical channel groups as well as the sPDCCH resources carrying the DL assignment
   sPDSCH is rate-matched around the resources carrying the DL assignment scheduling the sPDSCH
   sPDSCH is rate-matched around the resources of the indicated sPDCCH group for rate-matching
   sPDSCH is mapped on the unused sPDCCH resources of a sPDCCH group indicated as not being rate-matched
   sPDSCH is punctured by the used/occupied sPDCCH resources of a sPDCCH group indicated as not being rate-matched
8. eNB transmits the DCI carrying the DL assignment on sPDCCH as well as on the sPDSCH to the UE.

According to certain embodiments, the UE can perform some or all of the following functionality:
1. UE receives the DCI that carries the DL assignment on sPDCCH as well as on the sPDSCH from the eNB
2. UE decodes the DL assignment and determines the sPDCCH group signaling indication bitmap of size X, as well as determines the sPDSCH resource allocation
3. Based on the determined sPDSCH resource allocation, the UE determines its UE-specific sPDCCH candidate set
   Only sPDCCH candidates within the UE's sPDSCH allocation are included in the set of candidates
   The sPDCCH candidate where the DL assignment has been received is excluded from the set
4. UE determines the X logical signaling groups from the set of determined set of sPDCCH candidates according a certain rule
   The rule may be given in the specification or may be higher-layer configured by the eNB (at least one from a set of specified rules)
   The rules may include, for example:
      i. Grouping based on an equal number of sPDCCH resources within a group
      ii. Grouping based on an equal number of sPDCCH candidates within a group
      iii. Hybrid grouping based on an equal number of sPDCCH candidates and sPDCCH resources within a group.
5. The UE determines the sPDSCH resource mapping based on the indicated rate-matching around sPDCCH resource groups and the determined sPDCCH candidate groups
   The UE assumes sPDSCH rate-matching around the resources carrying the DL assignment scheduling the sPDSCH
   The UE assumes sPDSCH rate-matching around the resources of the sPDCCH group, for which the signaling in the DCI indicated rate-matching
   The UE assumes sPDSCH to be mapped on the sPDCCH resources (within the sPDSCH allocation) of a group, for which the signaling in the DCI indicated mapping of sPDSCH (i.e. not being rate-matched)
6. The UE decodes the sPDSCH according to the indicated sPDSCH resource mapping
   The UE may apply some different soft-bit/Log Likelihood Ratio weighting taking the potential eNB sPDSCH puncturing into account on sPDCCH resources indicated to carry sPDSCH
      In case the sPDCCH group contains only a single sPDCCH candidate, no specific soft-bit weighting is needed as clearly the resources are to carry sPDSCH
      In case the sPDCCH group contains more than a single sPDCCH candidate, the UE may reduce the reliability of the information in these sPDCCH REs in the decoding processes to take the potential sPDSCH puncturing by some sPDCCH candidate into account.
      In case the group of candidates contains one candidate with large number of REs and one candidate with small number of REs within sPDSCH allocation, the UE may reduce the reliability only for the resources of sPDCCH candidate with small number of REs within sPDSCH allocation.
      In case a sPDCCH candidate group indicated to carry sPDSCH is containing the sPDCCH candidate carrying a valid UL grant for the UE, the UE might assuming puncturing and set the LLR weighting for the resources of this sPDCCH candidate to 0 (or set the LLR weighting to a small value)

Certain embodiments of the present invention provide the advantage of enabling flexible signaling, and, therefore enable efficient reuse of unused sPDCCH resources with a modest number of signaling bits. Further, due to the UE-specific signaling grouping, the signaling granularity is adapted to sPDCCH candidates that can be potentially reused for PDSCH operation overall resulting in an optimized UE and PDSCH allocation specific signaling granularity/codebook. Certain embodiments may also operates with a constant number of signaling bits within DCI.

Figure 3:
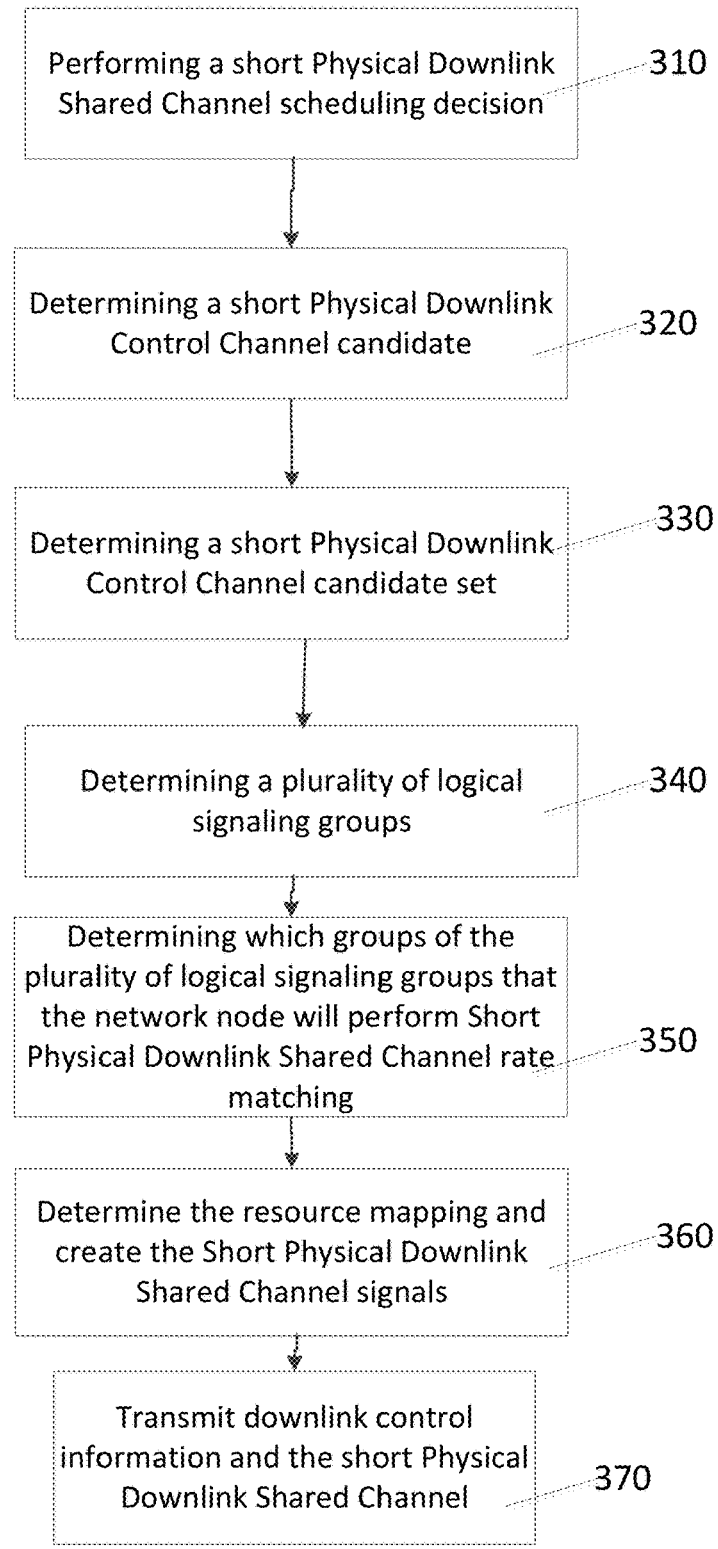
FIG. 3 illustrates a flowchart of a method in accordance with certain embodiments of the invention.

FIG. 3 illustrates a flowchart of another method in accordance with certain embodiments of the invention. The method may include, at 310, performing, by a network node, a short Physical Downlink Shared Channel scheduling decision for a user equipment. The method may also include, at 320, determining a short Physical Downlink Control Channel candidate for carrying a downlink assignment to the user equipment. The method may also include, at 330, determining a short Physical Downlink Control Channel candidate set. The short Physical Downlink Control Channel candidate set is specific to the user equipment. The method may also include, at 340, determining a plurality of logical signaling groups based on the determined candidate set. The method can also include, at 350, determining which groups of the plurality of logical signaling groups that the network node will perform short Physical Downlink Shared Channel rate matching. The method can also include, at 360, determining the resource mapping for the short Physical Downlink Shared Channel and create the respective short Downlink Shared Channel signals for transmission. In this step, the network node performs rate matching around candidates of the determined groups of the plurality of logical signaling groups as well as around a candidate that carries Downlink Control Information scheduling the short Physical Downlink Shared Channel. Short Physical Downlink Shared Channel is punctured by occupied candidates of groups that are not the determined groups. The method can also include, at 370, transmitting Downlink Control Information on short Physical Downlink Control Channel and the short Physical Downlink Shared Channel to the user equipment.

Figure 4:
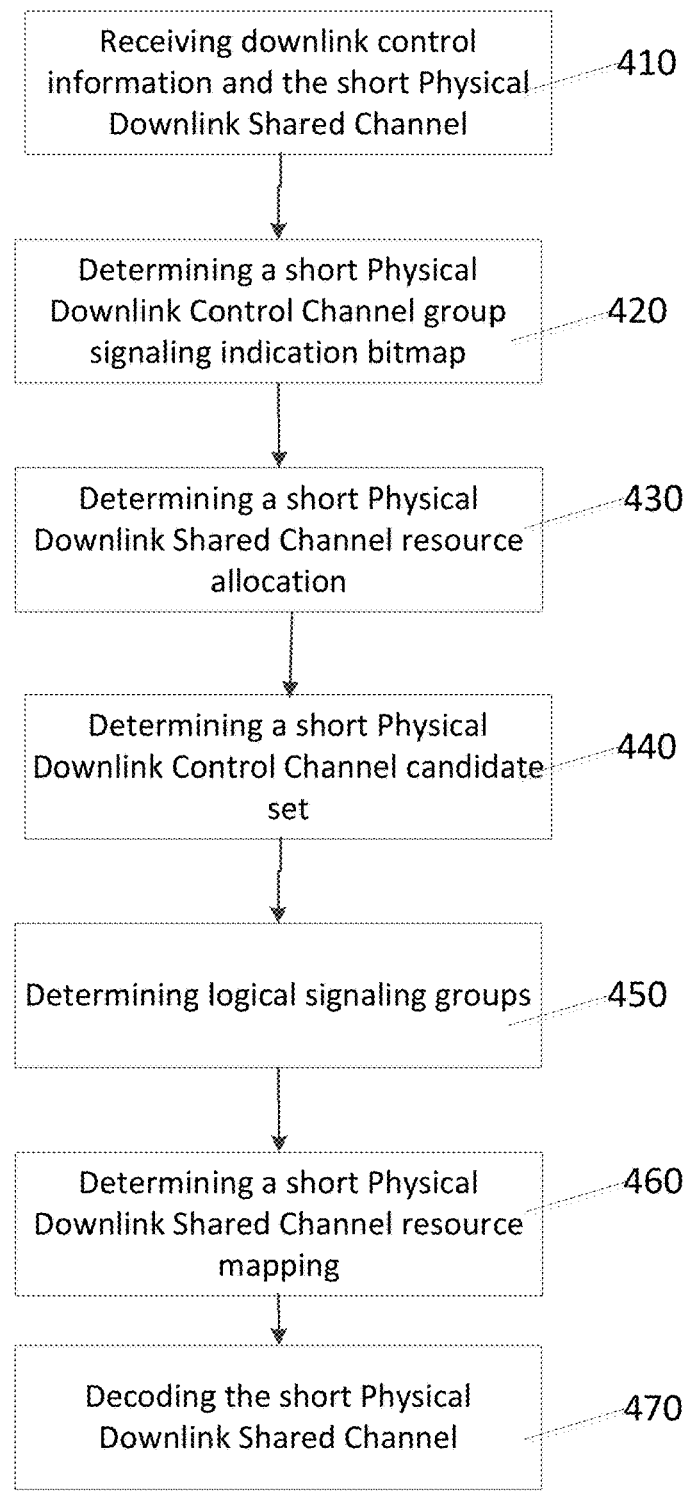
FIG. 4 illustrates a flowchart of another method in accordance with certain embodiments of the invention.

FIG. 4 illustrates a flowchart of another method in accordance with certain embodiments of the invention. The method may include, at 410, receiving, by a user equipment, downlink control information and short Physical Downlink Shared Channel. The downlink control information comprises a downlink assignment, and the downlink assignment is carried on short Physical Downlink Control Channel. The method may include, at 420, determining a short Physical Downlink Control Channel group signaling indication bitmap. The method may also include, at 430, determining a short Physical Downlink Shared Channel resource allocation. The method may also include, at 440, determining a short Physical Downlink Control Channel candidate set based on the determined resource allocation. The method may also include, at 450, determining logical signaling groups based on the determined candidate set. The method may also include, at 460, determining a short Physical Downlink Shared Channel resource mapping assuming that Short Physical Downlink Shared Channel is rate-matched around the downlink assignment scheduling the Short Physical Downlink Shared Channel as well as around the candidates of the short Physical Downlink Control Channel groups, for which the signaling in the downlink control information indicated rate-matching. The method may also include, at 470, decoding the short Physical Downlink Shared Channel based on the determined short Physical Downlink Shared Channel resource mapping.

Figure 5:
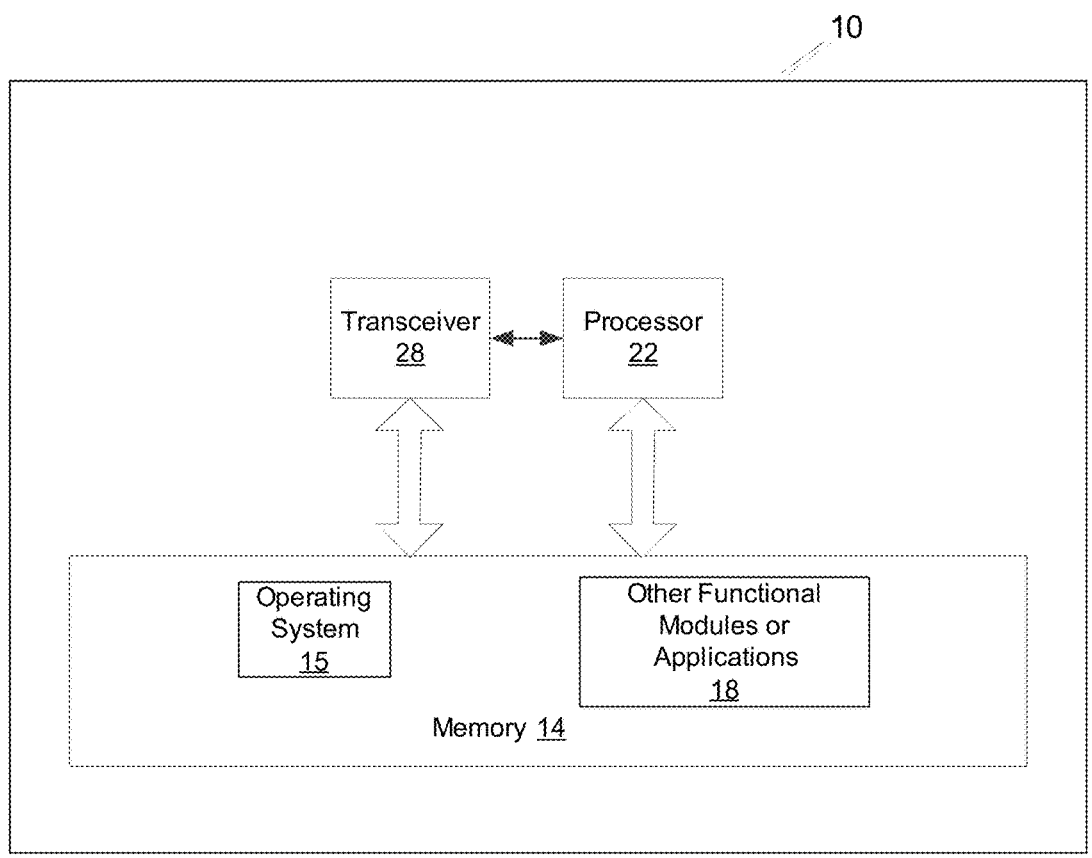
FIG. 5 illustrates an apparatus in accordance with certain embodiments of the invention.

FIG. 5 illustrates an apparatus in accordance with certain embodiments of the invention. In one embodiment, the apparatus can be a network node such as an evolved Node B and/or base station, for example. In another embodiment, the apparatus may correspond to a user equipment, for example. Apparatus 10 can include a processor 22 for processing information and executing instructions or operations. Processor 22 can be any type of general or specific purpose processor. While a single processor 22 is shown in FIG. 5, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 may include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 6:
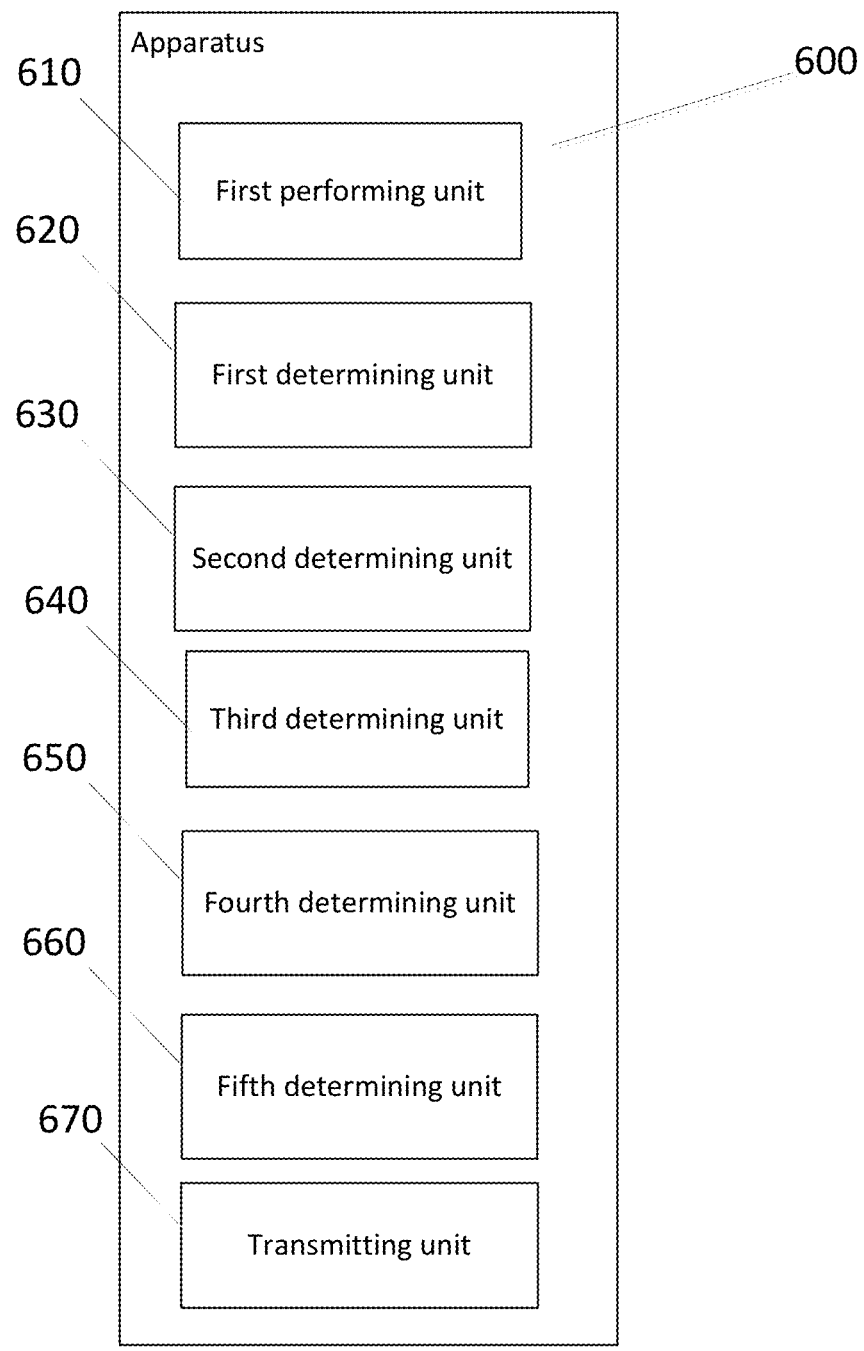
FIG. 6 illustrates an apparatus in accordance with certain embodiments of the invention.

FIG. 6 illustrates an apparatus in accordance with certain embodiments of the invention. Apparatus 600 can be an evolved Node B or a base station, for example. Apparatus 600 can include a first performing unit 610 that performs a short Physical Downlink Shared Channel scheduling decision for a user equipment. Apparatus 600 can also include a first determining unit 620 that determines a short Physical Downlink Control Channel candidate for carrying a downlink assignment to the user equipment. Apparatus 600 can also include a second determining unit 630 that determines a short Physical Downlink Control Channel candidate set. The short Physical Downlink Control Channel candidate set is specific to the user equipment. Apparatus 600 can also include a third determining unit 640 that determines a plurality of logical signaling groups based on the determined candidate set. Apparatus 600 can also include a fourth determining unit 650 that determines which groups of the plurality of logical signaling groups that apparatus 600 will perform short Physical Downlink Shared Channel rate matching. Apparatus 600 can also include a fifth determining unit 660 that determines the resource mapping for the short Physical Downlink Shared Channel and create the respective short Downlink Shared Channel signals for transmission. Apparatus 600 performs rate matching around candidates of the determined groups of the plurality of logical signaling groups as well as around a candidate that carries Downlink Control Information scheduling the short Physical Downlink Shared Channel. Short Physical Downlink Shared Channel is punctured by occupied candidates of groups that are not the determined groups. Apparatus 600 can also include a transmitting unit 670 that transmits Downlink Control Information on short Physical Downlink Control Channel and the short Physical Downlink Shared Channel to the user equipment.

Figure 7:
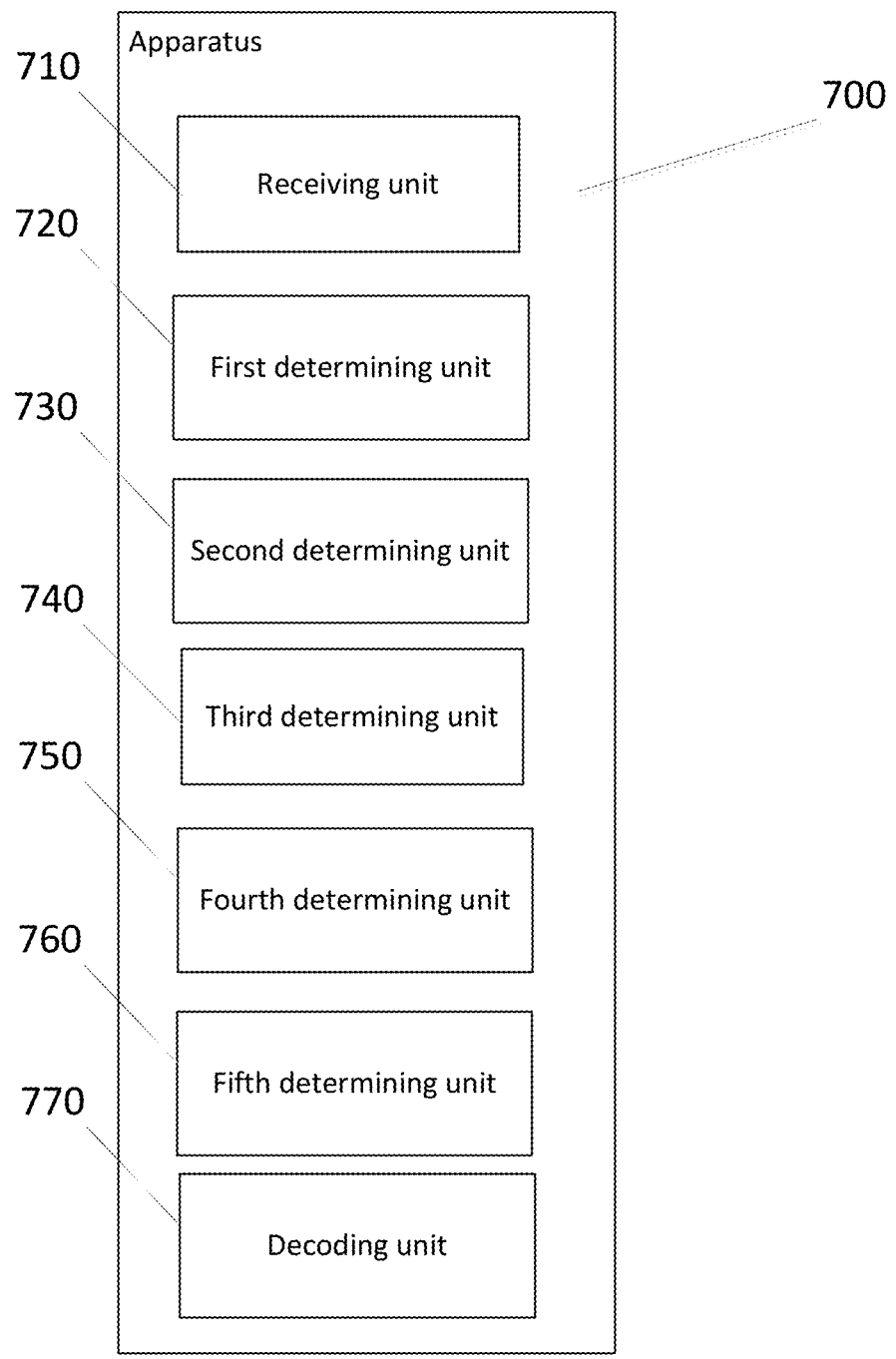
FIG. 7 illustrates an apparatus in accordance with certain embodiments of the invention.

FIG. 7 illustrates an apparatus in accordance with certain embodiments of the invention. Apparatus 700 can be a user equipment, for example. Apparatus 700 can include a receiving unit 710 that receives downlink control information and short Physical Downlink Shared Channel. The downlink control information comprises a downlink assignment, and the downlink assignment is carried on short Physical Downlink Control Channel. Apparatus 700 can also include a first determining unit 720 that determines a short Physical Downlink Control Channel group signaling indication bitmap. Apparatus 700 can also include a second determining unit 730 that determines a short Physical Downlink Shared Channel resource allocation. Apparatus 700 can also include a third determining unit 740 that determines a short Physical Downlink Control Channel candidate set based on the determined resource allocation. Apparatus 700 also includes a fourth determining unit 750 that determines logical signaling groups based on the determined candidate set. Apparatus 700 also includes a fifth determining unit 760 that determines a short Physical Downlink Shared Channel resource mapping assuming that Short Physical Downlink Shared Channel is rate-matched around the downlink assignment scheduling the Short Physical Downlink Shared Channel as well as around the candidates of the short Physical Downlink Control Channel groups, for which the signaling in the downlink control information indicated rate-matching. Apparatus 700 also includes a decoding unit 770 that decodes the short Physical Downlink Shared Channel based on the determined short Physical Downlink Shared Channel resource mapping.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   performing, by a network node, a short Physical Downlink Shared Channel scheduling decision for a user equipment;
   determining a short Physical Downlink Control Channel candidate for carrying a downlink assignment to the user equipment;
   determining a short Physical Downlink Control Channel candidate set, wherein the short Physical Downlink Control Channel candidate set is specific to the user equipment;
   determining a plurality of logical signaling groups based on the determined candidate set, wherein the determining the plurality of logical signaling groups is based on a grouping rule;
   determining which groups of the plurality of logical signaling groups that the network node will perform short Physical Downlink Shared Channel rate matching;
   determining the short Physical Downlink Shared Channel resource mapping and creation of the short Physical Downlink Shared Channel based on the short Physical Downlink Shared Channel rate matching; and
   transmitting Downlink Control Information on short Physical Downlink Control Channel and short Physical Downlink Shared Channel to the user equipment.

2. The method according to claim 1, wherein, in the determination of the short Physical Downlink Shared Channel resource mapping, the short Physical Downlink Shared Channel is rate-matched around a candidate carrying the downlink assignment scheduling the short Physical Downlink Shared Channel.

3. The method according to claim 1, wherein, in the determination of the short Physical Downlink Shared Channel resource mapping, the short Physical Downlink Shared Channel is rate-matched around candidates of the determined short Physical Downlink Control Channel groups.

4. The method according to claim 1, wherein, in the creation of the short Physical Downlink Shared Channel, the short Physical Downlink Shared Channel is punctured by the occupied candidates of the short Physical Control Channel groups determined not to be rate-matched.

5. The method according to claim 1, wherein the performing the short Physical Downlink Shared Channel scheduling decision comprises performing the decision by an evolved Node B.

6. The method according to claim 1, wherein only short Physical Downlink Control Channel candidates within the user equipment's short Physical Downlink Shared Channel allocation are included in the candidate set.

7. The method according to claim 1, wherein a short Physical Downlink Control Channel candidate used to transmit a downlink assignment for the user equipment is excluded from the candidate set.

8. The method according to claim 1, wherein the grouping rule comprises grouping based on an equal number of short Physical Downlink Control Channel candidates within a group, based on an equal number of short Physical Downlink Control Channel candidates within a group, or a hybrid grouping based on an equal number of short Physical Downlink Control Channel candidates and short Physical Downlink Control Channel resources within a group.

9. A non-transitory computer readable medium enclosing instructions that, when executed on a processor, perform a process according to the method of claim 1.

10. An apparatus, comprising:
    at least one processor; and
    at least one memory including computer program code,
    wherein the at least one memory and the computer program code are configured, with the at least one processor, to cause the apparatus at least to:
    perform a short Physical Downlink Shared Channel scheduling decision for a user equipment;
    determine a short Physical Downlink Control Channel candidate for carrying a downlink assignment to the user equipment;
    determine a short Physical Downlink Control Channel candidate set, wherein the short Physical Downlink Control Channel candidate set is specific to the user equipment;
    determine a plurality of logical signaling groups based on the determined candidate set, wherein the determining the plurality of logical signaling groups is based on a grouping rule;
    determine which groups of the plurality of logical signaling groups that the apparatus will perform short Physical Downlink Shared Channel rate matching;
    determine the short Physical Downlink Shared Channel resource mapping and creation of the short Physical Downlink Shared Channel based on the short Physical Downlink Shared Channel rate matching; and
    transmit Downlink Control Information on short Physical Downlink Control Channel and short Physical Downlink Shared Channel to the user equipment.

11. The apparatus according to claim 10, wherein, in the determination of the short Physical Downlink Shared Channel resource mapping, the short Physical Downlink Shared Channel is rate-matched around a candidate carrying the downlink assignment scheduling the short Physical Downlink Shared Channel.

12. The apparatus according to claim 10, wherein, in the determination of the short Physical Downlink Shared Channel resource mapping, the short Physical Downlink Shared Channel is rate-matched around candidates of the determined short Physical Downlink Control Channel groups.

13. The apparatus according to claim 10, wherein, in the creation of the short Physical Downlink Shared Channel, the short Physical Downlink Shared Channel is punctured by the occupied candidates of the short Physical Control Channel groups that are determined not to be rate-matched.

14. The apparatus according to claim 10, wherein the performing the short Physical Downlink Shared Channel scheduling decision comprises performing the decision by an evolved Node B.

15. The apparatus according to claim 10, wherein only short Physical Downlink Control Channel candidates within the user equipment's short Physical Downlink Shared Channel allocation are included in the candidate set.

16. The apparatus according to claim 10, wherein a short Physical Downlink Control Channel candidate that is used to transmit a downlink assignment for the user equipment is excluded from the candidate set.

17. The apparatus according to claim 10, wherein the grouping rule comprises grouping based on an equal number of short Physical Downlink Control Channel candidates within a group, based on an equal number of short Physical Downlink Control Channel candidates within a group, or a hybrid grouping based on an equal number of short Physical Downlink Control Channel candidates and short Physical Downlink Control Channel resources within a group.

18. A method, comprising:
   receiving, by a user equipment, downlink control information and short Physical Downlink Shared Channel, wherein the downlink control information comprises a downlink assignment, wherein the downlink assignment is carried on short Physical Downlink Control Channel, and wherein the short Physical Downlink Shared Channel is determined based on rate matching of a plurality of signal groups;
   determining a short Physical Downlink Control Channel group signaling indication bitmap;
   determining a short Physical Downlink Shared Channel resource allocation;
   determining a short Physical Downlink Control Channel candidate set based on the determined resource allocation;
   determining logical signaling groups based on the determined candidate set, wherein the determining the logical signaling groups is based on a grouping rule;
   determining a short Physical Downlink Shared Channel resource mapping;
   decoding the short Physical Downlink Shared Channel based on the determined short Physical Downlink Shared Channel resource mapping.

19. The method according to claim 18, wherein, in the determination of the short Physical Downlink Shared Channel resource mapping, the user equipment assumes short Physical Downlink Shared Channel rate-matching around a candidate carrying the downlink assignment scheduling the short Physical Downlink Shared Channel.

20. The method according to claim 18, wherein, in the determination of the short Physical Downlink Shared Channel resource mapping, the user equipment assumes short Physical Downlink Shared Channel rate-matching around candidates of the short Physical Downlink Control Channel group, for which the signaling in the downlink control information indicated rate-matching.

21. The method according to claim 18, wherein, in the determination of the short Physical Downlink Shared Channel resource mapping, the user equipment assumes short Physical Downlink Shared Channel to be mapped on the shared Physical Downlink Control Channel candidates of a group, for which the signaling in the downlink control information indicated mapping of short Physical Downlink Shared Channel.

22. The method according to claim 18, wherein the receiving downlink control information comprises receiving from an evolved Node B.

23. The method according to claim 18, wherein only short Physical Downlink Control Channel candidates within the user equipment's short Physical Downlink Shared Channel allocation are included in the candidate set.

24. The method according to claim 18, wherein a short Physical Downlink Control Channel candidate that is used to transmit the downlink assignment for the user equipment is excluded from the candidate set.

25. The method according to claim 18, wherein the grouping rule comprises grouping based on an equal number of short Physical Downlink Control Channel candidates within a group, based on an equal number of short Physical Downlink Control Channel candidates within a group, or a hybrid grouping based on an equal number of short Physical Downlink Control Channel candidates and short Physical Downlink Control Channel resources within a group.

26. A non-transitory computer readable medium encoding instructions that, when executed on a processor, perform a process according to the method of claim 18.

27. An apparatus, comprising:
   at least one processor; and
   at least one memory including computer program code,
   wherein the at least one memory and the computer program code are configured, with the at least one processor, to cause the apparatus at least to:
   receive downlink control information and short Physical Downlink Shared Channel, wherein the downlink control information comprises a downlink assignment, wherein the downlink assignment is carried on short Physical Downlink Control Channel, and wherein the short Physical Downlink Shared Channel is determined based on rate matching of a plurality of signal groups;
   determine a short Physical Downlink Control Channel group signaling indication bitmap;
   determine a short Physical Downlink Shared Channel resource allocation;
   determine a short Physical Downlink Control Channel candidate set based on the determined resource allocation;
   determine logical signaling groups based on the determined candidate set, wherein the determining the logical signaling groups is based on a grouping rule;
   determine a short Physical Downlink Shared Channel resource mapping;
   decode the short Physical Downlink Shared Channel based on the determined short Physical Downlink Shared Channel resource mapping.

28. The apparatus according to claim 27, wherein, in the determination of the short Physical Downlink Shared Channel resource mapping, the apparatus assumes short Physical Downlink Shared Channel rate-matching around a candidate carrying the downlink assignment scheduling the short Physical Downlink Shared Channel.

29. The apparatus according to claim 27, wherein, in the determination of the short Physical Downlink Shared Channel resource mapping, the apparatus assumes short Physical Downlink Shared Channel rate-matching around candidates of the short Physical Downlink Control Channel group, for which the signaling in the downlink control information indicated rate-matching.

30. The apparatus according to claim 27, wherein, in the determination of the short Physical Downlink Shared Channel resource mapping, the apparatus assumes short Physical Downlink Shared Channel to be mapped on the shared Physical Downlink Control Channel candidates of a group, for which the signaling in the downlink control information indicated mapping of short Physical Downlink Shared Channel.

31. The apparatus according to claim 27, wherein the receiving downlink control information comprises receiving from an evolved Node B.

32. The apparatus according to claim 27, wherein only short Physical Downlink Control Channel candidates within the apparatus' short Physical Downlink Shared Channel allocation are included in the candidate set.

33. The apparatus according to claim 27, wherein a short Physical Downlink Control Channel candidate that is used to transmit the downlink assignment for the apparatus is excluded from the candidate set.

34. The apparatus according to claim 27, wherein the grouping rule comprises grouping based on an equal number of short Physical Downlink Control Channel candidates within a group, based on an equal number of short Physical Downlink Control Channel candidates within a group, or a hybrid grouping based on an equal number of short Physical Downlink Control Channel candidates and short Physical Downlink Control Channel resources within a group.

* * * * *